(12) United States Patent
Amat

(10) Patent No.: US 11,090,880 B2
(45) Date of Patent: Aug. 17, 2021

(54) MULTI-LAYER BRAIDED ARTICLE

(71) Applicant: Ratier-Figeac SAS, Figeac (FR)

(72) Inventor: Pascal Amat, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 399 days.

(21) Appl. No.: 15/919,369

(22) Filed: Mar. 13, 2018

(65) Prior Publication Data

US 2018/0319100 A1 Nov. 8, 2018

(30) Foreign Application Priority Data

May 5, 2017 (EP) .................................... 17305509

(51) Int. Cl.
| | | |
|---|---|---|
| *B29C 70/22* | (2006.01) | |
| *D04C 1/06* | (2006.01) | |
| *B32B 5/02* | (2006.01) | |
| *B32B 5/26* | (2006.01) | |
| *B32B 7/12* | (2006.01) | |
| *F01D 5/28* | (2006.01) | |
| *B29L 31/30* | (2006.01) | |

(52) U.S. Cl.
CPC .............. *B29C 70/22* (2013.01); *B32B 5/024* (2013.01); *B32B 5/26* (2013.01); *B32B 7/12* (2013.01); *D04C 1/06* (2013.01); *F01D 5/282* (2013.01); *B29L 2031/3076* (2013.01); *B32B 2260/023* (2013.01); *B32B 2260/046* (2013.01); *B32B 2262/106* (2013.01); *B32B 2603/00* (2013.01); *D10B 2403/023* (2013.01); *D10B 2505/02* (2013.01)

(58) Field of Classification Search
CPC .......... B29C 70/22; B32B 5/024; B32B 5/26; B32B 7/12; B32B 2260/023; B32B 2260/046; B32B 2262/106; B32B 2603/00; F01D 5/282; D04C 1/06; D10B 2403/023; D10B 2505/02; B29L 2031/3076
USPC .......................................... 428/130, 124, 121
See application file for complete search history.

(56) References Cited

U.S. PATENT DOCUMENTS

| | | | |
|---|---|---|---|
| 3,892,192 A | * | 7/1975 | Boser .................. D05B 35/062 112/140 |
| 5,018,271 A | | 5/1991 | Bailey et al. |
| 5,222,297 A | | 6/1993 | Graff et al. |
| 5,279,892 A | | 1/1994 | Baldwin et al. |
| 5,672,417 A | | 9/1997 | Champenois et al. |
| 5,829,373 A | | 11/1998 | Baxter |
| 6,431,837 B1 | | 8/2002 | Velicki |
| 7,252,028 B2 | | 8/2007 | Bechtold et al. |
| 7,503,273 B2 | | 3/2009 | Beneventi et al. |
| 8,061,253 B2 | | 11/2011 | Wybrow |

(Continued)

FOREIGN PATENT DOCUMENTS

| | | |
|---|---|---|
| EP | 0743386 A1 | 11/1996 |
| EP | 2206597 A2 | 7/2010 |

OTHER PUBLICATIONS

Extended European Search Report for International Application No. 17305509.6 dated Dec. 1, 2017, 6 pages.

*Primary Examiner* — Elizabeth C Imani
(74) *Attorney, Agent, or Firm* — Cantor Colburn LLP

(57) ABSTRACT

A multi-layer braided article comprises a braid folded over itself to form a first layer and a second layer, and one or more blind stitches in the first layer. The one or more stitches define an edge of the first layer about which the braid folds from the first layer into the second layer.

10 Claims, 3 Drawing Sheets

Section A-A

(56) References Cited

U.S. PATENT DOCUMENTS 8,672,636 B2     3/2014   Laurent
9,278,826 B2     3/2016   Thrash et al.

\* cited by examiner

Section A-A

Section A-A

Section A-A

MULTI-LAYER BRAIDED ARTICLE

FOREIGN PRIORITY

This application claims priority to European Patent Application No. 17305509.6 filed May 5, 2017, the entire contents of which is incorporated herein by reference.

The present disclosure relates to a multi-layer braided article and a method of making a multi-layer braided article. The multi-layer braided article may form part of a blade for an aircraft engine.

BACKGROUND

Fibre composites are traditionally made from high-strength fibres that are woven, knitted, or braided into a shape and the shape is then fixed in shape by a resin. These composite materials often have very high strength-to-weight ratios compared to many metals. Fibre composites may have greater corrosion resistance than many metals. This makes fibre composites attractive in many industries and they are particularly suited to parts used in vehicle manufacturing such as aeronautics or aerospace.

A known weakness of many fibre composites is delamination. A fibre composite may have very high tensile modulus and high breaking strength along each fibre direction but may have a very low modulus and low breaking strength in directions transverse to the fibre directions. For example, a composite made of multiple layers of plain woven fabric stacked in the z-direction may have great tensile strength in the warp (x-direction) and weft (y-direction) axes of the fabric layers, but the layers may be readily pulled apart by a tension in the z-direction. Various methods exist to try to reduce delamination, for example having warp and/or weft fibres extending through multiple layers of woven fabric, as described in U.S. Pat. No. 5,672,417 to make 3D woven fabrics.

U.S. Pat. No. 7,252,028 discloses a method and device for braiding a rigid core with a braided structure of heavy duty fibres. The braided structure may be formed from multiple layers of braided material. These multiple layers may be formed by passing the core through the braiding ring in a first direction, to form the first braid layer, and then reversing the direction of motion of the core to form the second braid layer on top of the first braid layer. It is necessary to secure the first braid layer before reversing the direction of motion, or else the first braid layer will lose tension and/or come undone when starting to braid the second layer. U.S. Pat. No. 7,252,028 discloses a device for securing the first layer while the second layer is begun.

Braids are self-stabilizing after they have been formed to an initial length. To form this initial length of the second layer without losing tension or undoing the first layer, in U.S. Pat. No. 7,252,028, a first braid layer is formed around a core moving in the first direction through a known braiding machine. The device clamps a multi-part shell around the first braid layer. The direction of motion of the core through the braiding machine is then reversed and the second layer of braid starts to form over the shell. The edge of the multi-part shell determines a fold line where the first layer of braid folds over itself and becomes the second layer. After the second layer of braid has begun to form and has reached a self-stabilizing length, temporary pins are inserted near the fold line to secure both braid layers while the shell is removed from between the two layers of braid. Thereafter, the temporary pins are removed while the second layer of braid is continued. The second layer is therefore continuous with the first layer because the braid fibres forming the first layer continue into the second layer without any cut in the fibres.

The above process may be repeated to form a third layer of braid over the second layer etc. In this way, a multi-layer braided article may be formed.

The article, made from high-strength fibres, such as carbon fibres, aramids, and/or glass fibres, may form part of an airfoil blade after further processing. Traditionally, after braiding the multi-layer braided article is then either cured (if the fibres were pre-coated with a resin) or impregnated with a resin and then cured. This allows the formation of lightweight braided fibre composites that are particularly suitable for aeronautical components.

This process has been satisfactory for producing multi-layer braided articles however further improvements are desirable to, for example, simplify the process.

SUMMARY

In a first aspect, there is provided a multi-layer braided article comprising a braid folded over itself to form a first layer and a second layer; characterised by one or more blind stitches in the first layer, the one or more stitches defining an edge of the first layer about which the braid is folded.

The edge of the first layer about which the braid is folded may be termed the "first layer".

The one or more blind stitches eliminate the need for a multi-part shell as provided in U.S. Pat. No. 7,252,028 which simplifies the manufacturing process. The blind stitches may increase the strength between the layers of the multi-layer braided article because the blind stitches provide additional strength between the layers of braid. The blind stitches may increase the tension between layers as well as tension along the direction of stitching around the article. In an aircraft blade constructed using the multi-layer braided article, the blind stitches therefore improve the delamination resistance of a blade.

The blind stitches reduce the formation of "resin pockets" at the folds of a continuous multi-layer braided fibre composite made from a multi-layer braided article (e.g. an article made using the device of U.S. Pat. No. 7,252,028). Such pockets of resin are brittle and are a point of weakness in prior art fibre composites. The present article avoids the formation of pockets at the folds of the braid by reducing the radius of curvature so that both layers lie in close contact at the fold.

Braid ends are traditionally areas with reduced peel strength and reduced shear strength. The blind stitches in these areas improves the peel strength and shear strength.

Blind stitches are useful as they only require the person or machine doing the stitching to have access to one side of the article being stitched. Thus, a stitch in the multi-layer braided article may be stitched from the (current) outermost layer without requiring direct access to the underside of the lowermost layer through which the stich extends. This is distinct from most stitching techniques that require access to both sides of an article. A detailed description of blind stitching is given below.

The blind stitches may extend through more than one layer of the braid, which may provide greater interlayer reinforcement. In a propeller blade made using the multi-layer braided article, this provides increased delamination resistance.

In embodiments, the multi-layer braided article may further comprise a core and an initial layer attached thereto. The one or more blind stitches may penetrate through the first layer and into an initial layer attached to the core such that the blind stitches attach the first layer of the braid to the initial layer. Preferably the initial layer is a second braid. The initial layer may be attached to the core by an adhesive and/or by blind stitches in the initial layer that provide hoop tension around the core.

The multi-layer braided article is preferably made from yarns consisting of carbon fibres, glass fibres, or aramids or a mixture of these. Traditionally, a yarn may be comprised of several thousand individual continuous fibres of the material.

In embodiments, the braid of the multi-layer braided article is formed from high strength fibres suitable for aeronautical applications, preferably wherein the fibres are one or more of: carbon fibre, glass fibre, or an aramid.

The blind stitches may be made with the same fibres/yarns as the braid or with different fibres/yarns. Aramids or glass fibres may be more suitable for stitching than carbon fibre.

The multi-layer braided article may include a uniaxial, bi-axial or tri-axial braid, as desired for different applications. In some non-limiting examples, the braid may be a (0, ±45°) braid, a (±45°) braid, or a (20°, 30°, 70°) braid.

The multi-layer braided article may further comprise a third layer of the braid. This third layer may be formed in a very similar manner to the second layer. That is, by stitching a second set of one or more blind stitches extending at least through the second layer to maintain tension in the second layer and define a second edge about which the second layer folds over itself into the third layer. In this manner a third, fourth or fifth etc. layer of the braid may be added to the multi-layer braided structure. Thus, all braid layers are formed from a single continuous braid that only requires two cuts (to tidy the edges), one at the very beginning of the braiding and one at the very end of the braiding.

In embodiments, the multi-layer braided article may further comprise a second set of one or more blind stitches extending at least through the second layer; and a third layer formed on top of the second layer; wherein the second one or more blind stitches in the second layer is configured to maintain tension in the second layer and define a second edge about which the second layer folds over itself into the third layer. Thus, in the context of this disclosure, it will be appreciated that where an "edge" of a particular layer is referred to, this can be understood as the edge about which that layer folds to form the next layer.

In the multi-layer braided article according to the above embodiment, the second set of blind stitches may penetrate through the second layer and the first layer, and optionally, into the initial layer if present.

In a multi-layer braided article having at least three layers, certain of the edges may be superposed over one another or may be staggered from one another along the length of the article. For example, in embodiments of the multi-layer braided article as described above, for a given value of n>0: an $(n+2)^{th}$ edge of a layer (n+2) may be directly on top of an $n^{th}$ edge of another layer n, such that the edges are coincident. Or, an $(n+2)^{th}$ edge of a layer (n+2) may not be on top of the $n^{th}$ edge of another layer n, such that there is a stepped profile between the two layers. It will be appreciated that here, "n" takes its normal meaning as an integer value. It will be understood that "directly on top of" and "coincident" mean that the edges in question are at the same location, e.g. the same longitudinal position along the core.

Described in another way, the multi-layer braided article may comprise layers n, n+1, n+2 and n+3, each arranged on top of each other, and where n is any integer >0. Layer n folds into layer n+1 at edge n, layer n+1 folds into layer n+2 at edge n+1, and layer n+2 folds into layer n+3 at edge n+2. The edge n of layer n may be coincident with edge n+2 of layer n+2, i.e. having the same longitudinal position along the core. Or, edge n of layer n may not be coincident with edge n+2 of layer n+2, e.g. it may be located at a different longitudinal position along the core, such that the edges are staggered in the longitudinal direction.

The multi-layer braided article may further comprise reinforcement stitching to attach two or more layers of braid through the thickness of the article. The reinforcement stitching comprises one or more blind stitches at a location other than an edge about which the braid folds over itself. That is, the reinforcement stitching is distinct from the stitch or stitches that form an edge about which the braid may fold into a new layer.

In embodiments, the multi-layer braided article may further comprise reinforcement stitching comprising one or more blind stitches penetrating at least two layers of the multi-layer braided article at a location other than an edge about which the braid folds over itself; wherein the reinforcement stitching is configured to provide delamination resistance for the multi-layer braided article.

Reinforcement stitching may be added after forming multiple layers of the article.

During braiding, the multi-layer braided article is braided around a core which may be a prepreg (a fibrous material pre-impregnated with a particular synthetic resin), a spar foam, a metal, or other suitable material. The core is to provide support for the braid during construction.

In some applications it is desirable to remove the core after forming the multi-layer braided article.

In other applications it is desirable to keep the core within the multi-layer braided article after forming the article; for example the core may provide strength to a finished blade made using the multi-layer braided article.

If the multi-layer braided article is for forming a blade for a propeller, then traditionally such a blade has a blade root " " which is a metal part (usually steel) that forms the root of the blade that connects to a rotor disc or hub, and that connects to the multi-layer braided article or a blade formed therewith. Blind stitches would not be able to penetrate a metal blade root to secure a braided layer thereto.

The multi-layer braided article may be part of an aircraft component. In embodiments, an aircraft component may comprise the multi-layer braided article. The aircraft component may be a blade, and the blade may further comprise a metal blade root configured to engage a rotor disc or hub.

In a second aspect, the present disclosure provides a method of making a multi-layer braided article, the method comprising the steps of 1) braiding a first layer over a core by braiding in a first direction along the core; 2) stitching one or more blind stitches into the first layer to define an edge of the first layer; and 3) continuing the braiding in a second direction, opposite the first direction, along the core to form a second layer over the first layer; wherein the one or more blind stitches maintains tension in the first layer during the braiding in the second direction.

This method allows the production of any of the foregoing examples of a multi-layer braided article.

Before braiding the multi-layer braided article, an initial layer may be formed over the core that is firmly attached to the core. Optionally, the initial layer may also extend over the blade root and be firmly attached thereto. This initial layer may be a braid or other material/structure suitable for receiving blind stitches. The initial layer may be attached to the core by adhesive or by stitching the initial layer to itself tightly in a circumferential direction around the core to create hoop tension around the core. That is, the initial layer may be stitched so as grip the core in the same manner as tight cuff of a shirtsleeve grips the wearer's wrist.

When the first layer is braided over the initial layer to the location for the set of one or more stitches, the one or more blind stitches extend into the initial layer so as to anchor the first layer with respect to the core, so that tension of the first layer is not lost when the direction of braiding is reversed. The initial layer may form part of the multi-layer braided article of any of the aforementioned examples.

Alternatively, the first layer may be braided around the core (with no initial layer) up to a first location along the core. At that point, the blind stitches may stitch the first layer to itself such that the first layer is in hoop tension around the core. The braiding direction is then reversed and the second layer is formed by continuing the braid, wherein the blind stitches form the edge at which the folding occurs.

In one example of the above, a first or initial layer of braid is secured around the core at either end of the layer of braid by blind stitching the braid around the core. Immediately adjacent each of the two locations where the braid is secured around the core, the cross-sectional area of the core increases in a direction towards the other location. This ensures that neither end of the braid may move along the core towards the other end due to the hoop tension preventing the braid cross-section from expanding over the increasing cross-sectional area. This is a common shape for propellers where the cross section of the propeller bulges in the middle of the propeller and is smaller towards the hub and tip of the propeller.

To form a third layer, the method may further comprise the steps of: stitching a second set of one or more blind stitches into the second layer to define an edge of the second layer; and continuing the braiding in the first direction along the core to form a third layer over the second layer. Similar to the first layer, the blind stitch(es) maintain tension in the second layer during the braiding of the third layer in the first direction.

Reinforcement stitching may be added to the multi-layer braided article by stitching through at least two layers of the braid at a location other than an edge about which the braid folds over itself. This can provide delamination resistance to the multi-layer braided article if it is formed into a blade for a propeller.

In embodiments, the method may comprise the step of stitching reinforcement stitches through at least two layers of the braid at a location other than an edge about which the braid folds over itself, to provide interlayer reinforcement to the multi-layer braided article.

To allow the production of a wider variety of shapes of the finished multi-layer braided article, the method may further include cutting the multi-layer braided article at a location adjacent reinforcement stitching, such that a portion of the braid is cut from the rest of the multi-layer braided article.

The cutting may be performed using a laser or a cutting disc, or any other method known to the skilled person for cutting braided articles. In one non-limiting example, a three-layer braided article is provided with reinforcement stitching coupling the second and third layers together. A cutting surface is inserted underneath the second layer (e.g. between the first layer and the second layer) up to a point adjacent the reinforcement stitching. This action may require cutting of the blind stitch(es) that form the edge where the second layer folds over into the third layer. A cutting tool or laser is then applied to the third layer so as to cut through the third layer, through the second layer and to the cutting plate which prevents the cutting from going deeper (e.g. into the first layer). The portion of the second layer and third layer that extends from the reinforcement stitching to the fold where the second layer folds over into the third layer may then be removed from the article.

Alternatively, rather than inserting the cutting surface under the already-formed braid, the cutting surface may be placed adjacent the core or a layer of braid during the braiding process, and a layer of braid is then continued over the cutting surface.

After braiding the multi-layer braided article, it may be desired to form it into a fibre composite by curing a resin that encapsulates the fibres. In some examples, the fibres of the braid may already be coated with a curable-resin that is then cured, e.g. in an autoclave. In other examples, a resin may be impregnated into the multi-layer braided article and then cured, e.g. in an autoclave.

In embodiments, the method may comprise a step of removing the core from the multi-layer braided article, preferably further comprising the step of curing the multi-layered braided article with a resin. If desired, the core may be removed before curing if it is not to be a part of the finished article.

In a further aspect, the disclosure provides a method of making a propeller blade, the method comprising providing a blade root adjacent a core, wherein the blade root is for attaching a blade to a hub or rotor disc; performing the method of making a multi-layer braided article as described above to make the multi-layer braided article around the core and the blade root; and curing a resin in the multi-layer braided article. Optionally, before or after curing the resin, the method may comprise removing the core from the multi-layer braided article.

This method of making a propeller blade describes making the multi-layer braided article around the core and the blade root as described above. It will be appreciated that the method of making the article is described previously as braiding the article over a core (and not a blade root). However, such a method can be extended to braiding the article over both a core and a blade root, where the "core and blade root" forms the "core" of the method of making the multi-layer braided article.

The multi-layer braided article according to any of the above examples may be simpler to manufacture than the articles manufactured according to U.S. Pat. No. 7,252,028 by eliminating the need for the device of U.S. Pat. No. 7,252,028. Further, the resulting multi-layer braided article has through-thickness reinforcement from the blind stitch(es). In a propeller blade, this through thickness reinforcement is useful for improving delamination resistance.

DESCRIPTION OF THE FIGURES

Certain embodiments of the present disclosure will now be described in greater detail by way of example only and with reference to the accompanying drawings in which.

DETAILED DESCRIPTION

Blind stitching is a method of stitching an article when the needle only has access to one face of the article to be stitched. This is unlike a conventional sewing machine which has two bobbins of thread, one on each side of the article to be stitched. When the needle, carrying a first thread from one side of the article, penetrates the article it picks up the second thread from the other bobbin and pulls the second thread back through the article.

A machine for blind stitching is described in detail in U.S. Pat. No. 5,829,373 and a brief summary of the process is provided below.

In blind stitching, the stitching machine moves a curved needle back and forth in an arcuate fashion, the arc extending through the article to be stitched. The needle has a hole near the pointed tip that carries the thread. The needle enters into a first face of the article at a first location. The needle curves through the body of the article, pulling the thread with it, and exits out through the first face of the article at a different, second, location.

When the pointed tip exits the second location, a movable protrusion of the machine catches a loop of the thread that has been pulled through the article by the needle. The movable protrusion moves so as to extend the loop of thread from the second location and pull it across the first face of the article such that a loop is formed on the first face of the article. The loop surrounds a third location on the first face of the article.

Meanwhile, the curved needle is pulled back through the article along the same path it originally travelled—the protrusion holding the loop of thread prevents this action from removing the thread that was originally carried through the article. The curved needle is then moved along the first face of the article and penetrates it at the third location—that is, the needle and thread enter the article inside the loop of thread.

After the needle enters the article at the third location, the protrusion is moved so as to release the loop and the bobbin holding the thread is driven in reverse to pull thread back through the article from the second location and thus tighten the loop to form a stitch.

The process repeats when the needle exits the first face at a fourth location and a loop of thread is again caught by the movable protrusion and a loop is formed around a fifth location on the first face. Thus, a line of stitches may be formed across the article. Further, this blind stitching process may be done automatically by a robot without human intervention.

Figure 1A:
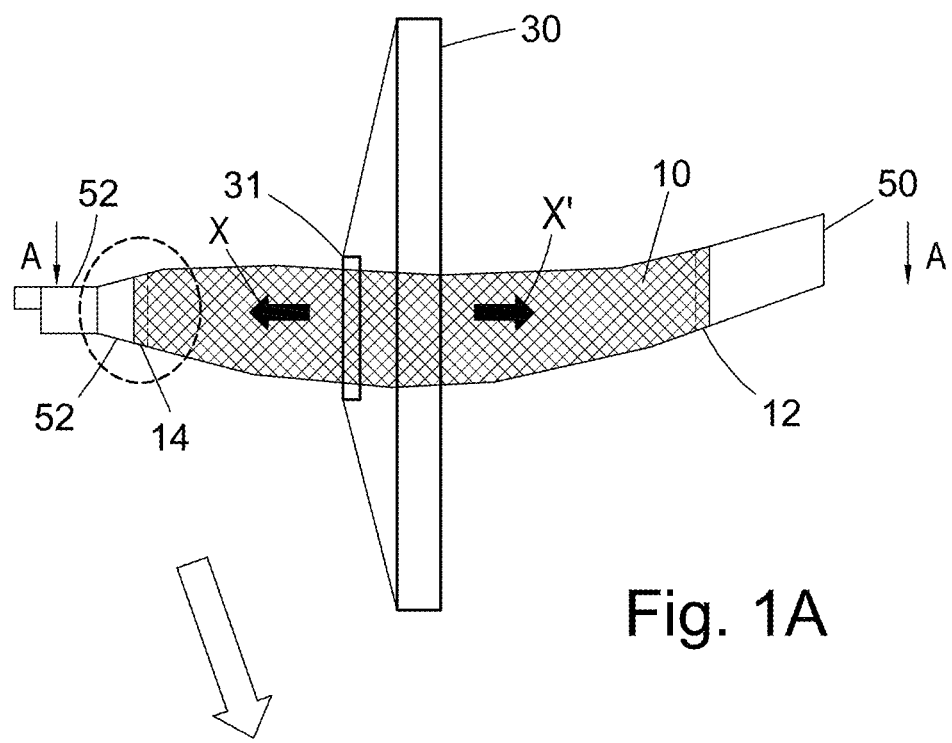
FIG. 1A shows an article according to the present disclosure.

FIG. 1A shows a plan view of a multi-layer braided article 10 that is mid-way through a braiding machine 30 (also known as a braiding wheel—such devices are well known in the art). The multi-layer braided article 10 is being formed around a core 50 and a metal blade root 52. The multi-layer braided article 10 has a first set 12 of blind stitches and a second set 14 of blind stitches. Whilst multiple stitches in each set are described, in other embodiments there may be only one stitch in each set. Each set of stitches (12, 14 etc.) is schematically depicted as a pair of parallel lines in the figures.

The braid of the multi-layer braided article is preferably formed from high strength fibres suitable for aeronautical applications, such as carbon fibre, glass fibre, or an aramid or a mixture thereof.

Figure 1B:
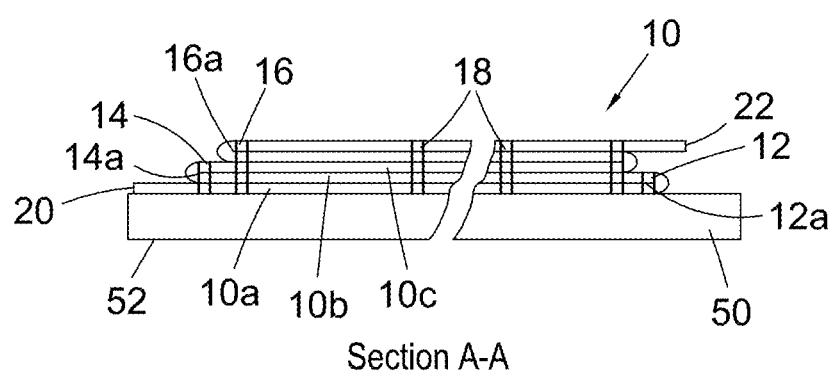
FIG. 1B shows a cross-section of the article across line A-A of FIG. 1A.

FIG. 1B shows a cross-section across line A-A of the multi-layer braided article 10 of FIG. 1A. In FIG. 1B a first layer 10a of braid starts at an end 20 that sits on the blade root 52. The first layer 10a is braided along the blade root 52 and core 50 by moving the blade root 52 and core 50 in a first direction X through the braiding machine 30 such that the first layer 10a of the braid is formed across and around the blade root 52 and onto the core 50 to a first location that will become the first edge 12a.

Once the braid has been braided to the first location, a first set 12 of blind stitches is stitched through the first layer 10a to clamp or "freeze" the first layer 10a of the braid at the first location.

After stitching the first set 12 of blind stitches, the direction of motion of the blade root 52 and core 50 is reversed such that they move through the braiding machine 30 in a second direction X' that is opposite to the first direction X. The first set 12 of blind stitches provides a first edge 12a around which the braid may fold and be formed into a second layer 10b. The first set 12 of blind stitches maintains tension in the first layer 10a during the braiding in the second direction X'.

The second layer 10b extends over the first layer 10a. The second layer 10b is braided in the same manner as the first layer 10a, i.e. along/around the core 50 and the blade root 52, up to a second location. Thus, a multi-layer braided article is formed comprising a braid folded over itself to form a first layer 10a and a second layer 10b. One or more blind stitches are provided in the first layer 10a, the one or more stitches defining an edge of the first layer 10a about which the braid is folded.

At the second location, a second set 14 of blind stitches may be stitched into the braid to clamp or freeze the second layer 10b; for example the stitches in the second layer 10b may extend into the first layer 10a.

After stitching the second set 14 of blind stitches, the direction of motion of the blade root 52 and core 50 is again reversed such that they move through the braiding machine 30 in the original first direction X that is opposite to the second direction X'. The second set 14 of blind stitches provides a second edge 14a around which the braid may fold and be formed into a third layer 10c.

This process may repeat for any number of layers depending on the article being formed, wherein each layer of braid is stitched by a set 12, 14, 16 of blind stitches to the layer (or layers) beneath.

In the illustrated embodiments, the blind stitches in each set extend around the entire perimeter of the braid, but in other embodiments, the braid may only be stitched partly around its perimeter.

It is not necessary to cut the braid at any of the folds, thus the first layer 10a is continuous with the second layer 10b and the second layer 10b is continuous with the third layer 10c etc.

To finish the multi-layer braided article, the braid is braided to a second end 22 which may then be clamped to the rest of the article (or to the core 50 or blade root 52) and cut. As a result, there are only two cut ends of the fibres forming the braid.

Figure 2A:
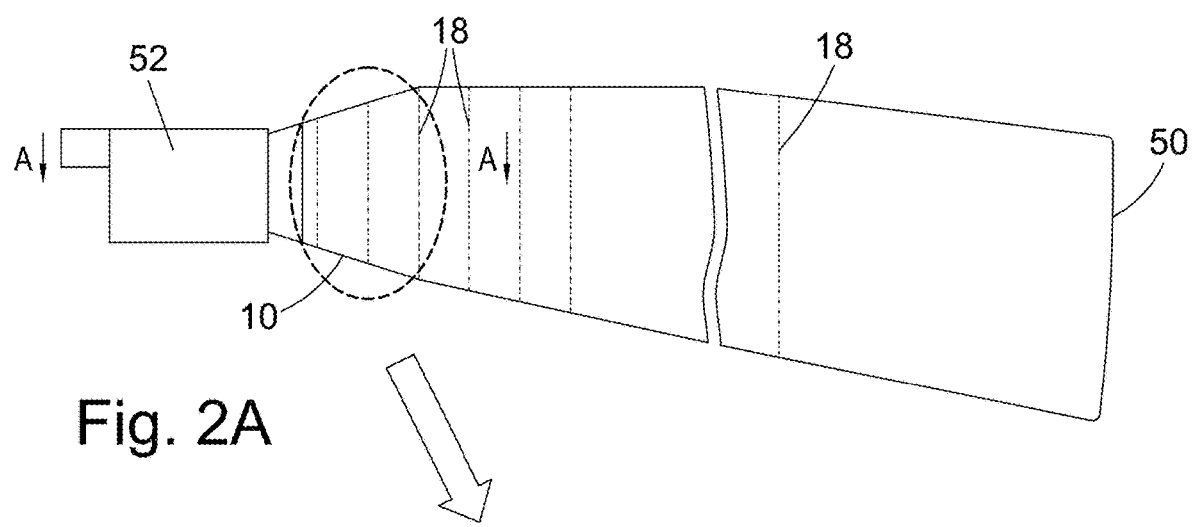
FIG. 2A shows a plan view of another article according to the present disclosure.
Figure 2B:
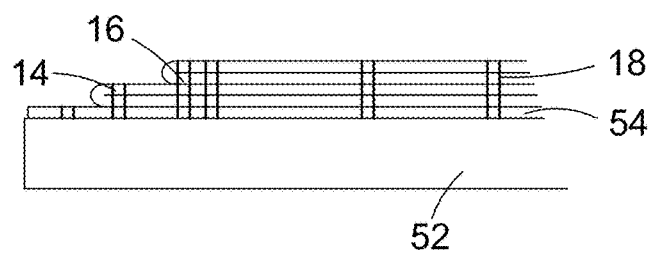
FIG. 2B shows a cross-section of the article of FIG. 2A across line A-A.

As shown in FIG. 1B and FIG. 2B, sets 18 of blind stitches may also be inserted into the article at points other than an edge 12a, 14a, 16a (i.e. not at the end where the braid is to fold over itself and become another layer). These are called reinforcement stitching 18. Reinforcement stitching 18 can provide reinforcement between the layers. In propeller blade constructed with the multi-layer braided article, this can increase the resistance to delamination of the finished blade.

As shown in FIG. 2B, the reinforcement stitching 18 may optionally be added before all layers of the multi-layer braided article 10 are completed, such that the reinforcement stitches 18 do not penetrate the outermost layer of the finished article 10.

FIG. 2B shows an example having an initial layer 54 formed on the core 50. The initial layer 54 may be a single layer of braid (a "second braid") that was formed over the core 50 (and optionally blade root 52) and secured at both ends. The securing may be done by gluing the initial layer to the core. Alternatively or additionally, the securing may be effected by stitching blind stitches into the initial layer 54 in a loop around the circumference of the core. This loop of stitches can provide hoop tension in the initial layer 54 around the core 50. When this is done at both ends of the initial layer, it can anchor the initial layer 54 to the core in both directions by hoop tension provided that each end of the initial layer 54 has a loop of stitches around a region of the core having a smaller cross-sectional area whilst the region between the two ends of the core has a larger cross-sectional area. The larger cross-sectional area compared to the loop formed by the stitches at the ends prevents the loop (and thus the initial layer 54) from moving over the larger cross-sectional area and thus neither end of the initial layer can translate along the core.

FIG. 1B shows an example where the edge 14a of the second layer (or, generally, the $n^{th}$ edge of the $n^{th}$ layer) and the edge 16a of the fourth layer (or, generally, the $(n+2)^{th}$ edge of the $(n+2)^{th}$ layer) are not formed at the same location (i.e. same longitudinal position) along the core 50. This creates a stepped profile for the braided article 10. This may be true for any value of n>0. That is, the first and third edges may be formed at different locations along the core or the fifth and seventh edges may be formed at different locations along the core 50 etc. Conversely, an $(n+2)^{th}$ edge may be directly on top of (i.e. superposed over) an $n^{th}$ edge. That is, the edge n at which layer n folds into layer n+1, and the edge n+2 at which layer n+2 folds into layer n+3, may occur at the same location along the core. This may be true for any value of n>0. A braided article 10 may have a mixture of the above two options, wherein some edges are superposed on top of one another (i.e. are coincident) and other edges are staggered from one another (i.e. are at different longitudinal positions) along the length of the core 50.

Figure 3A:
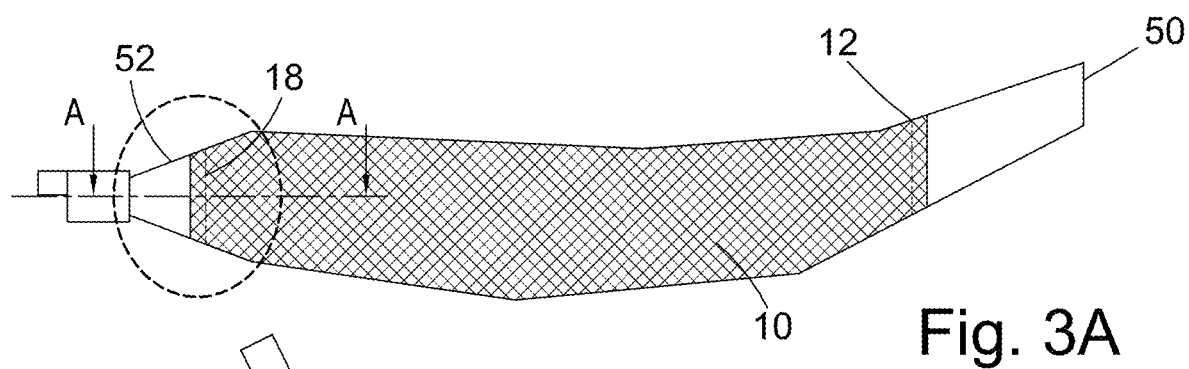
FIG. 3A shows the article of FIG. 1 removed from braiding machine.
Figure 3B:
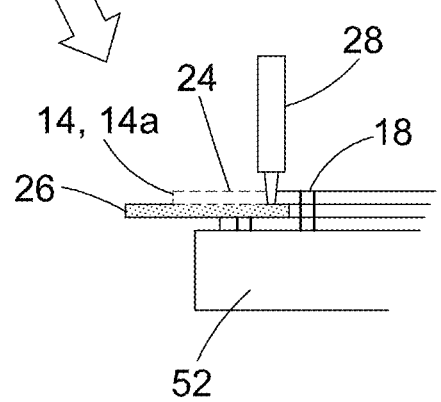
FIG. 3B shows the article of FIG. 3 being cut to remove a portion of the article.

FIGS. 3A and 3B illustrate an embodiment where a portion 24 of the multi-layer braided article 10 is to be cut from the rest of the article 10. In FIG. 3B, the second layer 10b was originally formed to a second location and a set 14 of blind stitches was added to form an edge 14a about which the braid was folded to become the third layer 10c. The third layer 10c then extends along the blade root 52 and core 50 in the manner described hereinbefore.

Reinforcement stitching 18 was added to the third layer 10c to secure it to the first and second layers 10a, 10b of the braid.

As shown in FIG. 3B, a cutting plate 26 in the form of a collar has been inserted between the first and second layers 10a, 10b up to the reinforcement stitching 18. The third layer 10c is shown being cut using a cutting tool 28. The cutting tool 28 may be a laser or a cutting disc or any other suitable cutting machine. The cutting plate 26 protects the first layer 10a during cutting of the second and third layers 10b, 10c.

The reinforcement stitching 18 prevents the second and third layers 10b, 10c from losing tension and/or coming undone beyond the cutting location.

The cutting may be performed automatically, e.g. by a machine, thus reducing the amount of human time/labour required in producing the multi-layer braided article.

As shown in FIGS. 1A and 3A, the core 50 may extend beyond the braid at one end of the multi-layer braided article 10. Similarly, the blade root 52 may extend beyond the braid at the other end of the multi-layer braided article 10.

The examples shown in FIGS. 1A, 2A and 3A are in the shape of blades intended for a propeller aircraft. However, a multi-layer braided article made according to the present disclosure may take other forms and is not limited to aircraft propeller blades. For example, the multi-layer braided article may form part of a high-performance drive shaft, a connecting rod, a rod for a hydraulic actuator etc.

In multi-layer braided articles 10 intended for aeronautical or aerospace uses, it is useful to use fibres having a very high tensile modulus. Suitable examples are carbon fibres, aramid fibres (e.g. Kevlar™), and/or glass fibres. Braiding machines 30 generally utilize a large number of spools (or bobbins) and thus a number of different fibres may be used for the multi-layer braided article 10 in a variety of ratios.

In one example, the core 50 is a carbon fibre prepreg and the braid is primarily aramid fibres (e.g. Kevlar™) with ≤5% glass fibres.

In the blade examples shown in FIGS. 1A, 2A, and 3A, the multi-layer braided article 10 is formed around a core 50 in the shape of the blade, and the braid also connects to a blade root 52. The multi-layer braided article 10 may therefore take on the general shape of the underlying core. However, other factors influence the final shape and dimensions, such as the tension of the braids, the braid angle(s) selected, the thickness of the fibres/yarns, and the number of layers of braid at each location along the core 50.

It is possible to have the braid follow curves of the core 50 by altering the angle at which the core 50 enters the braiding machine 30 (specifically, as it moves through the braiding ring 31 of the braiding machine 30) as it moves in the first direction X or second direction X'. The braiding ring 31 supports the yarns close to the core just before they are braided onto the core (or onto previously braided layers). The first direction X and the second direction X' are both defined perpendicular to the plane of the braiding ring 31.

In other examples where the multi-layer braided article 10 is not for a propeller blade, the blade root may be dispensed with and the article 10 may be formed around a core of any appropriate shape.

Herein, the term "first layer" may also be referred to as a "first braid layer", the "second layer" may be referred to as a "second braid layer" etc.

The present disclosure simplifies the manufacture of a multi-layer braided article. The complex shell-arrangement of U.S. Pat. No. 7,252,028 is effectively replaced by the blind stitches, thus reducing the amount of equipment required, and the stitches additionally provide inter-layer reinforcement for the article.

The use of blind stitches (as opposed to conventional sewing) is advantageous since the curved needle avoids damage to the blade root surface and the core surface. It also enables the reinforcement of other areas of the braided article in the span and chordwise directions.

A radial braiding machine is particularly useful as it gives more space for the stitching head of the robot.

The present disclosure also reduces the number and duration of several post-braiding steps that are required by some known processes. For example, the process described in U.S. Pat. No. 8,672,636 utilises four separate braiding machines in a line to build up four layers of braid, one after another. However, after the braiding process, each layer of braided article will have two ends that need to be tidied up by hand before any curing of the finished fibre composite blade may take place. Currently, this cutting step must be performed by hand and this can take up to two-thirds of the total blade braiding time. Compared to this process, the present disclosure reduces the number of braid-ends to two, regardless of the number of braid layers, which reduces the labour time and cost of production.

While the apparatus and methods of the subject disclosure have been shown and described with reference to embodiments, those skilled in the art will readily appreciate that changes and/or modifications may be made thereto without departing from the scope of the disclosure.

The invention claimed is:

1. A multi-layer braided article comprising:
 a braid folded over itself to form a first layer and a second layer;
 a set of one or more blind stitches in the first layer, the one or more stitches defining an edge of the first layer about which the braid is folded; and
 a core and an initial layer attached thereto;
 wherein the one or more blind stitches penetrate through the first layer and into the initial layer attached to the core;
 wherein the blind stitches attach the first layer of the braid to the initial layer; and
 wherein the initial layer is a second braid.

2. The multi-layer braided article according to claim 1, wherein the initial layer is attached to the core by an adhesive and/or by blind stitches in the initial layer that provide hoop tension around the core.

3. The multi-layer braided article according to claim 1, wherein
 the braid is formed from high strength fibres suitable for aeronautical applications.

4. The multi-layer braided article according to claim 3, wherein the fibres are one or more of: carbon fibre, glass fibre, an aramid, or a mixture thereof.

5. The multi-layer braided article according to claim 1, wherein
 the braid is a bi-axial braid or a tri-axial braid.

6. The multi-layer braided article according to claim 1, further comprising
 a second set of one or more blind stitches extending at least through the second layer; and
 a third layer formed on top of the second layer;
 wherein the second set of one or more blind stitches in the second layer is configured to maintain tension in the second layer and define a second edge about which the second layer folds over itself into the third layer.

7. The multi-layer braided article according to claim 6, wherein
 the second set of blind stitches penetrates through the second layer and the first layer, and optionally, into the initial layer if present.

8. The multi-layer braided article according to claim 6, wherein, for a given value of n>0:
 an $(n+2)^{th}$ edge of a layer (n+2) is directly on top of an $n^{th}$ edge of another layer n, such that the edges are coincident; or
 an $(n+2)^{th}$ edge of a layer (n+2) is not on top of the $n^{th}$ edge of another layer n, such that there is a stepped profile between the two layers.

9. The multi-layer braided article according to claim 1, further comprising
 reinforcement stitching comprising one or more blind stitches penetrating at least two layers of the multi-layer braided article at a location other than an edge about which the braid folds over itself;
 wherein the reinforcement stitching is configured to provide delamination resistance for the multi-layer braided article.

10. An aircraft component comprising the multi-layer braided article of claim 1;
 wherein the aircraft component is a blade, the blade further comprising a metal blade root configured to engage a rotor disc or hub.

* * * * *